United States Patent
Lee et al.

(10) Patent No.: US 10,647,820 B2
(45) Date of Patent: May 12, 2020

(54) METHOD FOR SYNTHESIZING PRE-HYDROLYZED ALKYL POLYSILICATE

(71) Applicant: LG CHEM, LTD., Seoul (KR)

(72) Inventors: Kyu Reon Lee, Daejeon (KR); Kyoung Shil Oh, Daejeon (KR); Je Kyun Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 37 days.

(21) Appl. No.: 16/065,720

(22) PCT Filed: Oct. 30, 2017

(86) PCT No.: PCT/KR2017/012062
§ 371 (c)(1),
(2) Date: Jun. 22, 2018

(87) PCT Pub. No.: WO2018/093063
PCT Pub. Date: May 24, 2018

(65) Prior Publication Data
US 2019/0330423 A1    Oct. 31, 2019

(30) Foreign Application Priority Data
Nov. 18, 2016  (KR) .................. 10-2016-0153916

(51) Int. Cl.
C08G 77/02    (2006.01)

(52) U.S. Cl.
CPC ................... C08G 77/02 (2013.01)

(58) Field of Classification Search
None
See application file for complete search history.

(56) References Cited

U.S. PATENT DOCUMENTS

| | | | |
|---|---|---|---|
| 7,931,940 B2 | 4/2011 | Suzuki et al. | |
| 2003/0157011 A1 | 8/2003 | Mori | |
| 2005/0047985 A1 | 3/2005 | Mori et al. | |
| 2008/0025900 A1 | 1/2008 | Mori | |
| 2009/0087665 A1 | 4/2009 | Suzuki et al. | |
| 2009/0093605 A1 | 4/2009 | Ramdani et al. | |
| 2009/0306326 A1* | 12/2009 | Magee | C08G 77/02 528/39 |
| 2011/0160429 A1 | 6/2011 | Magee et al. | |
| 2015/0105529 A1 | 4/2015 | Fosdick et al. | |
| 2016/0137841 A1 | 5/2016 | Warnshuis et al. | |

FOREIGN PATENT DOCUMENTS

| | | |
|---|---|---|
| EP | 1113036 | 12/2005 |
| JP | 2002265605 | 9/2002 |
| JP | 2008273834 | 11/2008 |
| JP | 2009-075583 | 4/2009 |
| JP | 2010150139 | 7/2010 |
| JP | 2014501320 | 1/2014 |
| KR | 10-2008-0078918 | 8/2008 |
| KR | 10-2015-0010794 | 1/2015 |

* cited by examiner

Primary Examiner — Clinton A Brooks
Assistant Examiner — Kofi Adzamli
(74) Attorney, Agent, or Firm — Dentons US LLP

(57) ABSTRACT

The present invention relates to a two-step synthesis method of a pre-hydrolyzed alkyl polysilicate. In the method, a silica precursor hydrated to 90 to 100% is added to maximize a condensation reaction rate, and a silica precursor hydrated to 25 to 70% is additionally added to terminate a condensation reaction, so that a condensation reaction time may be remarkably shortened relative to a conventional one-step synthesis method and may be shortened even without the use of a condensation catalyst, so that the catalyst purchase cost and the catalyst separation step in the process may not be required, thus having a simple process and reducing the production cost. Also, the amount and time point of the silica precursor additionally added may be controlled, thereby easily controlling the gelation reaction time and the weight average molecular weight, and synthesizing the pre-hydrolyzed alkyl polysilicate excellent in storage stability and processabilty.

9 Claims, 4 Drawing Sheets

METHOD FOR SYNTHESIZING PRE-HYDROLYZED ALKYL POLYSILICATE

CROSS-REFERENCE TO RELATED APPLICATIONS

This application is a National Stage Application of International Application No. PCT/KR2017/012062 filed on Oct. 30, 2017, which claims priority to and the benefit of Korean Patent Application No. 10-2016-0153916, filed on Nov. 18, 2016, in the Korean Intellectual Property Office, the disclosure of which is incorporated herein in its entirety by reference for all purposes as if fully set forth herein.

TECHNICAL FIELD

The present invention relates to a method for synthesizing a pre-hydrolyzed alkyl polysilicate through the addition of two steps of silica precursors.

BACKGROUND ART

An aerogel is a superporous, high specific surface area material having a porosity of about 90 to 99.9% and a pore size in range of 1 to 100 nm, and is a material having excellent properties of ultra light weight, super insuation, ultra low dielectric constant and the like. Accordingly, research on the development of aerogel materials as well as research on the practical use thereof as transparent insulation materials, environmentally friendly high temperature insulation materials, ultra-low dielectric thin films for highly integrated devices, catalysts and catalyst carriers, electrodes for supercapacitors, and electrode materials for seawater desalination have been actively studied.

The biggest advantage of the aerogel is that the aerogel has a super-insulation exhibiting a thermal conductivity of 0.3 W/m·K or less, which is lower than that of an organic insulation material such as conventional Styrofoam, and that fire vulnerability and the occurrence of harmful gases in case of fire which are fatal weaknesses of the organic insulation material can be solved.

In general, the aerogel is produced by producing a hydrogel from a silica precursor such as water glass, alkoxysilane series (TEOS, TMOS, MTMS, etc.) and the like, and removing the liquid components in the hydrogels without destroying microstructures. Typical forms of the aerogel may be classified into three types: powder, granular, and monolith, and the aerogel is generally in the form of powder.

Particularly, tetra ethyl orthosilicate (TEOS) among silica precursors is a material widely used in the industrial fields which produce a coating agent, an insulation material, porous ceramic and the like. In the market, various products such as pure TEOS, condensed TEOS, pre-hydrolyzed TEOS (HTEOS) and the like are on sale.

Among them, HTEOS is an ethyl polysilicate oligomyer material having a broad molecular weight distribution. When HTEOS is synthesized in the form of oligomer from TEOS monomer, physical properties such as gelation time and the like may be controlled, so that HTEOS may be easily applied in accordance with the user's reaction condition. In addition, HTEOS has the advantage of making the reproducible properties of the final product.

The HTEOS is generally synthesized by condensation reaction of TEOS which has passed through a partial hydration step under acidic conditions. In this case, the condensation reaction proceeds in a reflux reaction under acidic conditions, so that there is a disadvantage that the condensation rate is very slow. On the other hand, a condensation catalyst may be used in order to increase the condensation rate. However, in this case, it is difficult to control the molecular weight of the reaction product, and the occurrence of the production cost of the catalyst and the addition of the catalyst separation process must be required in the synthesis step, so that there is a disadvantage in that the process is complicated and the manufacturing cost is increased.

Accordingly, the inventors of the present invention have developed a novel method for synthesizing a pre-hydrolyzed alkyl polysilicate in which through the addition of the silica precursor in two steps, the condensation reaction time is remarkably shortened compared with the conventional synthesis method, and the condensation catalyst is not used, so that the process is simple and the production cost can be remarkably reduced.

PRIOR ART LITERATURE (Patent Document 1) Japanese Patent Laid-Open Publication No. 2014-501320 (published on Jan. 20, 2014).

DISCLOSURE OF THE INVENTION

Technical Problem

An aspect of the present invention provides a novel two-step synthesis method of a pre-hydrolyzed alkyl polysilicate. In the method, a silica precursor having a hydration degree of 90 to 100% is added to maximize a condensation reaction rate, and the silica precursor having a hydration degree of 25 to 70% is additionally added to terminate a condensation reaction, so that the condensation reaction time may be remarkably shortened compared to the conventional one-step synthesis method.

Another aspect of the present invention provides a novel synthesis method of a pre-hydrolyzed alkyl polysilicate, which may shorten the condensation reaction time without the use of a condensation catalyst, thus not requiring the catalyst purchase cost and the catalyst separation step in the process to enable the process to be simple and the production cost to be reduced.

Still another aspect of the present invention provides a pre-hydrolyzed alkyl polysilicate, which controls the added amount of the further added second silica precursor and the time point of addition, thereby easily controlling the gelation reaction time and the weight average molecular weight, and being excellent in storage stability and processabilty.

Technical Solution

The present invention provides a method for synthesizing a pre-hydrolyzed alkyl polysilicate, the method including the steps of: 1) adding a first silica precursor to perform a first condensation reaction; and
2) adding a second silica precursor to perform a second condensation reaction,
wherein the first silica precursor is hydrated to 90 to 100%, and the second silica precursor is hydrated to 25 to 75%.

In addition, the present invention provides a pre-hydrolyzed alkyl polysilicate synthesized by the synthesis method.

Advantageous Effects

A two-step synthesis method of a pre-hydrolyzed alkyl polysilicate according to the present invention may remarkably shorten the condensation reaction time compared to the conventional one-step synthesis method, and the method may not require the catalyst purchase cost and the catalyst separation step in the process, thus simplifying the process and reducing the production cost.

In addition, a synthesis method of the present invention may synthesize a pre-hydrolyzed alkyl polysilicate which easily controls the gelation reaction time and the weight average molecular weight and is excellent in storage stability and processabilty.

BRIEF DESCRIPTION OF THE DRAWINGS

The following drawings attached to the specification illustrate preferred examples of the present invention by example, and serve to enable technical concepts of the present invention to be further understood together with detailed description of the invention given below, and therefore the present invention should not be interpreted only with matters in such drawings.

MODE FOR CARRYING OUT THE INVENTION

Figure 1:
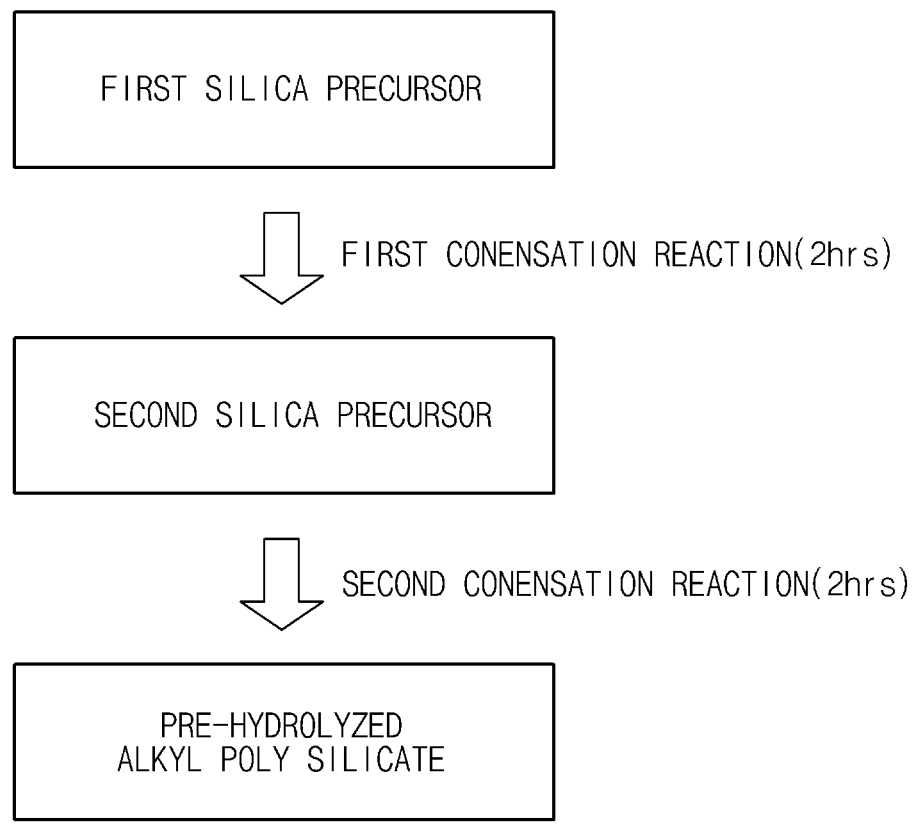
FIG. 1 is a flowchart schematically showing a method for synthesizing a pre-hydrolyzed alkyl polysilicate of an embodiment of the present invention.

Hereinafter, the present invention will be described in more detail to allow for a clearer understanding of the present invention. It will be understood that terms or words used in the present specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

A method for synthesizing a pre-hydrolyzed alkyl polysilicate according to an embodiment of the present invention includes the steps of: 1) adding a first silica precursor to perform a first condensation reaction; and 2) adding a second silica precursor to perform a second condensation reaction, wherein the first silica precursor is hydrated to 90 to 100%, and the second silica precursor is hydrated to 25 to 75%.

Generally, when a monomer such as TEOS is used as a silica precursor, the molecular weight of a final product or the gelation reaction time is difficult to be controlled, and the stability is lowered. So, a pre-hydrolyzed alkyl poly silicate oligomer having a molecular weight of about 1000 is prepared and used. This is because, unlike a monomer such as TEOS, when an oligomer type material is used, the stability may be obtained even when the hydration degree is increased for controlling the gelation reaction time. However, the pre-hydrolyzed alkyl polysilicate has a very low condensation reaction rate and thus needs a long time for synthesis thereof, and when a catalyst is used to increase the synthesis rate, the molecular weight of the oligomer, which is a final product, is difficult to be controlled, the additional cost resulting from catalyst purchase occurrs, and a catalyst separation process is added in the synthesis step, so that the process may be complicated and the production cost may be increased.

Accordingly, the present invention introduces a novel two-step synthesis method in which the first silica precursor having a hydration degree of 90 to 100% is added to maximize the condensation reaction rate, and the second silica precursor having a hydration degree of 25 to 75% is further added to terminate the condensation reaction, thereby solving the above problems. In addition, the added amount of the further added second silica precursor and the time point of addition are controlled, so that there is provided a method for synthesizing a novel pre-hydrolyzed alkyl polysilicate which may easily control the gelation reaction time and weight average molecular weight and synthesize a pre-hydrolyzed alkyl polysilicate excellent in storage stability.

Hereinafter, a method for synthesizing a novel pre-hydrolyzed alkyl polysilicate according to an embodiment of the present invention will be described in detail for each step.

Step 1)

Step 1) according to an embodiment of the present invention is a step of maximizing a condensation reaction rate to shorten a total condensation reaction time, wherein the first silica precursor is added to perform the first condensation reaction.

The silica precursor usable in the present invention may be a silicon-containing alkoxide-based compound, and specifically, may be tetra alkyl silicate such as tetra methyl ortho silicate (TMOS), tetra ethyl ortho silicate (TEOS), methyl triethyl ortho silicate, dimethyl diethyl ortho silicate), tetra propyl ortho silicate, tetra isopropyl ortho silicate, tetra butyl ortho silicate, tetra secondary butyl ortho silicate, tetra tertiarybutyl ortho silicate, tetra hexyl ortho silicate, tetra cyclohexyl ortho silicate, tetra dodecyl ortho silicate, or the like. More specifically, the silica precursor in the present invention may be tetra ethyl ortho silicate (TEOS).

In addition, in the present invention, the first silica precursor may be one in which the silica precursor usable in the present invention is hydrated with 1.8 to 2 equivalents of water to have a hydration degree of 90 to 100%.

As shown in Reaction Formula 1 below, a conventional method for synthesizing a pre-hydrolyzed alkyl polysilicate performed the condensation reaction in which the silica precursor reacted with 1.54 equivalents of water to produce a silica precursor partially hydrated to less than 90%. In this case, there was a problem that a long condensation reaction time of 24 hours is required.

[Reaction Formula 1]

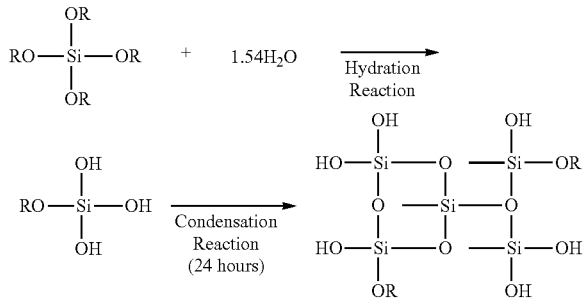

Accordingly, in order that the present invention solves the problem of long condensation reaction time, as shown in Reaction Formula 2, the first silica precursor having a hydration degree of 90 to 100% is hydrated with 1.8 to 2 equivalents of water to maximize the condensation reaction rate, so that the problem of long synthesis time required in the conventional method has been solved.

[Reaction Formula 2]

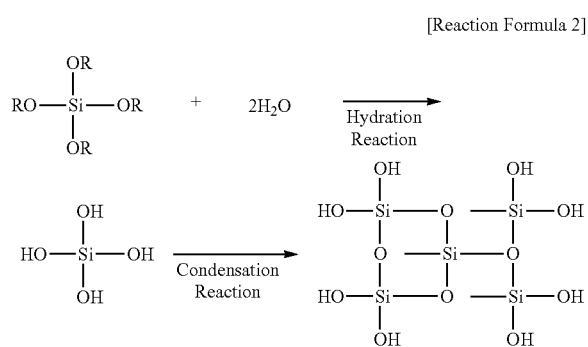

More specifically, the tetra alkyl silicate usable as the silica precursor of the present invention is hydrated theoretically with up to two equivalents of water, so that four —OR groups may be substituted with —OH groups, and the —OH groups become a reaction site, and the condensation reaction occurs. Therefore, the greater the equivalent weight of water reacting with the tetra alkyl silicate, the more the hydration reaction occurs, and thus the more —OR groups are replaced with —OH groups, thereby increasing the condensation reaction rate.

The first silica precursor added in Step 1) of the present invention is obtained by hydration reaction with 1.8 to 2 equivalents of water, and 90 to 100% of —OR groups may be replaced with —OH groups to maximize the condensation reaction rate.

Accordingly, the present invention does not require the use of a phosphorus nitrogen compound (PNC) condensation catalyst such as a phosphonitrilic chloride trimer which is conventionally used as a condensation reaction catalyst, so that the molecular weight of the final product is easily controlled, and the catalyst purchase cost and the catalyst separation step in the process are not required. Therefore, there is an advantage that the process may be simple and the production cost may be reduced.

On the other hand, by controlling an alcohol content added to the hydration step, a silica ($SiO_2$) content included in the pre-hydrolyzed alkyl polysilicate finally generated may be controlled so as to be 0.1 wt % to 30 wt %. When the silica content is less than 0.1 wt %, a silica gel content generated after the gelation reaction is too low, and thus there is a possibility that a required level of chemical properties may not be expected; when the silica content exceeds 30 wt %, the excessive formation of silica gel may cause the mechanical properties, particularly flexibility, to be deteriorated.

Step 2)

Step 2) according to an embodiment of the present invention is a step of terminating the condensation reaction, wherein the second silica precursor is added to perform the second condensation reaction. Meanwhile, in the second silica precursor, the kind of silica precursor and the silica content, which may be used, are the same as those described in Step 1).

In addition, in the present invention, the second silica precursor may be one in which the silica precursor usable in the present invention is hydrated with 0.5 to 1.5 equivalents of water to have a hydration degree of 25 to 75%.

More specifically, when the tetra alkyl silicate usable as the silica precursor of the present invention is hydrated to a certain level or more to perform the condensation reaction, the condensation reaction is not terminated due to the presence of a large number of the —OH groups as reaction sites, so that the pre-hydrolyzed alkyl polysilicate may be produced in which the molecular weight is not easily controlled and the molecular weight distribution is somewhat wider; when the added amount of silica precursor is reduced to terminate the condensation reaction arbitrarily, the viscosity may easily increase during storage and custody prior to the gelation reaction, so that storage stability and processability may be degraded.

Thus, conventional synthesis methods have used less than 90% partially hydrated tetra alkyl silicate, so that the pre-hydrolyzed alkyl polysilicate is generally synthesized through the condensation reaction.

However, in order to maximize the condensation reaction rate in the present invention, it is inevitable to use the silica precursor having a hydration degree of 90 to 100% by being hydrated with 1.8 to 2 equivalents of water. Accordingly, in order to solve the problem that the condensation reaction is not terminated, the silica precursor, which is hydrated with 0.5 to 1.5 equivalents of water to have a hydration degree of 25 to 75%, is sequentially added in two-step, thereby enabling the condensation rate to be maximized and the condensation reaction to be terminated in an adequate level, so that a pre-hydrolyzed alkyl polysilicate having optimum molecular weight, storage stability, processability was intended to be synthesized.

Therefore, as shown in Reaction Formula 3 below, the present invention is characterized by providing a method for synthesizing an alkyl polysilicate pre-hydrolyzed by a two-step process, wherein the first silica precursor hydrated to 90 to 100% by being hydrated with 1.8 to 2 equivalents of water is added to obtain a maximum condensation reaction rate through the first condensation reaction, and then the condensation reaction is slowly terminated while 0.5 to 1.5 equivalents of water and the second silica precursor hydrated to 25 to 75% are added to perform the second condensation reaction.

[Reaction Formula 3]

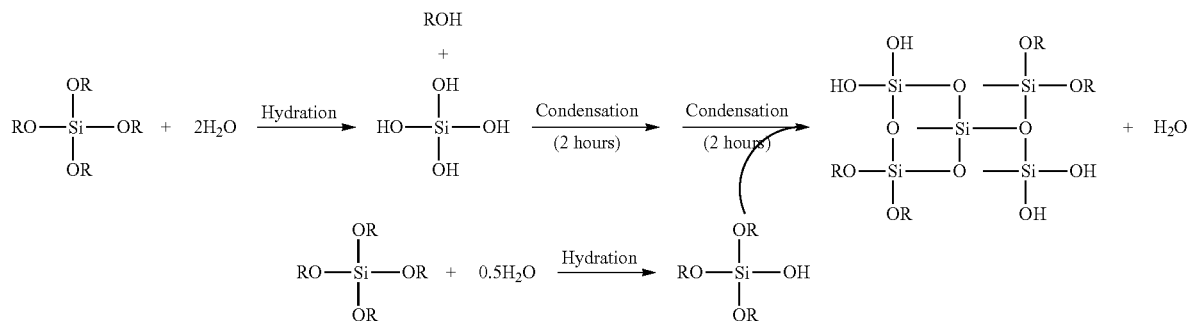

On the other hand, the first condensation reaction rate is characterized to be faster than the second condensation reaction rate. The first condensation reaction is a step of maximizing the condensation reaction rate in order to shorten the time taken in the whole process, and the second condensation reaction is a step of appropriately terminating the condensation reaction to synthesize the pre-hydrolyzed alkyl polysilicate having the optimum molecular weight, storage stability and processability.

In this regards, according to the synthesis method of the present invention, the condensation reaction time may be remarkably shortened from conventional 24 hours to about 4 hours, and at the same time, the molecular weight may be easily controlled according to the required physical properties, and the viscosity is maintained during a certain period of about 60 days, so that there is an effect that an pre-hydrolyzed alkyl polysilicate excellent in storage stability and processability may be synthesized.

Meanwhile, the termination of the condensation reaction indicates that —OR groups increase on the surface of oligomer not to condensate the silica precursor any more due to the steric hindrance of bulky —OH groups, and the termination may be observed at a point where the rate of the condensation reaction is remarkably decreased and then maintained at a low level or the weight average molecular weight is stabilized without further increasing.

In the present invention, in order to maximize the condensation reaction rate, synthesize the pre-hydrolyzed alkyl polysilicate oligomer in an appropriate weight average molecular weight, and control the gelation reaction time, it is important that the first and second silica precursors are added at an adequate ratio.

Accordingly, the mass ratio of the first and second silica precursors added in the synthesis method of the present invention is characterized to be 10:1 to 10:3. In the present invention, when the first and second silica precursors are added based on the above numeral range, the condensation reaction rate may be maximized and the condensation reaction rate may be also terminated at an appropriate level, thereby enabling the weight average molecular weight of the finally produced oligomer, the gelation reaction time to be easily controlled and the storage stability and processabilty to improve.

When a small amount of the second silica precursor is added so as to exceed the above numeral range, the condensation reaction rate may not be terminated in an appropriate level to produce an oligomer having an excessive molecular weight, and the amount of —OH groups present in the surface of the oligomer is large to excessively increase the gelation reaction time, so that there may be a problem that the processability and the easiness of process is deteriorated.

In addition, the present invention controls the time point of addition of the second silica precursor after the addition of the first silica precursor, thereby enabling the weight average molecular weight of the finally produced pre-hydrolyzed alkyl polysilicate to be controlled.

In the synthesis method of the present invention, when the second silica precursor is added after 1 to 3 hours from the addition of the first silica precursor, a pre-hydrolyzed alkyl polysilicate having a weight average molecular weight of 1000 to 1500, more specifically 1200 to 1500, which is targeted by the present invention may be synthesized.

When the second silica precursor is added earlier than the above-mentioned time, the effect of increasing the synthesis rate may be decreased due to the maximization of the first condensation reaction rate targeted by the present invention, and the oligomer having a weight average molecular weight smaller than the targeted level of the present invention may be produced; when being added later than the above-mentioned time, the oligomer having a weight average molecular weight larger than the level targeted by the present invention may be produced, thereby deteriorating viscosity properties and storage stability.

In addition, the present invention provides a pre-hydrolyzed alkyl polysilicate which is synthesized by the above synthesis method to be excellent in viscosity properties, storage stability and processability.

As described above, in the method for synthesizing a pre-hydrolyzed alkyl polysilicate according to an embodiment of the present invention, the first silica precursor, which is hydrated to 90 to 100% with 1.8 to 2 equivalents of water, is added to maximize the condensation reaction rate, and the second silica precursor, which is partially hydrated to 25 to 75% with 0.5 to 1.5 equivalents of water is further added to introduce a two-step process for terminating the condensation reaction, so that the condensation reaction time may be remarkably shortened in comparison with the conventional one-step synthesis method and may be shortened without the use of a condensation catalyst, thus having a simple process and reducing the production cost. Also, the added amount and time point of further adding the second silica precursor are controlled, so that there is an effect that the gelation reaction time and the weight average molecular weight may be easily controlled and the pre-hydrolyzed alkyl polysilicate excellent in storage stability and processability may be synthesized.

Hereinafter, examples of the present invention will be described in detail so that those skilled in the art can easily carry out the present invention. The present invention may, however, be embodied in many different forms, and should not be construed as limited to the examples set forth herein.

Example 1

80 g of a first TEOS was stirred with 24 g of ethanol and 13.9 g of a HCl aqueous solution of pH 1.8 was added, and thus the first TEOS reacted with 2 equivalent of water to be hydrated completely. Thereafter, a first condensation reaction was performed by heating at 85° C. for 2 hours.

After 2 hours from the addition of the first TEOS, 20 g of a second TEOS, which was partially hydrated with 6 g of ethanol and 0.87 g of a HCl aqueous solution of pH 1.8, was added, and thus a second condensation reaction was carried out by heating at 85° C. for 2 hours.

Then, the temperature was lowered to room temperature, and the finally produced pre-hydrolyzed ethyl polysilicate oligomer was recovered.

Examples 2 and 3

A pre-hydrolyzed ethyl polysilicate oligomer was synthesized in the same manner as in Example 1, except that the addition ratio of the equivalent weight of water and the first and second silica precursors to 1 mol of the second silica precursor was used in an amount as shown in Table 1 below in Example 1.

Comparative Example 1

A pre-hydrolyzed ethyl polysilicate oligomer was synthesized in the same manner as in Example 1, except that only the first silica precursor was added and the second silica precursor was not added in Example 1.

Comparative Examples 2 and 3

A pre-hydrolyzed ethyl polysilicate oligomer was synthesized in the same manner as in Example 1, except that the equivalent weight of water added relative to 1 mol of the first silica precursor is changed into the amount as shown in Table 1 below in Example 1.

Comparative Example 4

A pre-hydrolyzed ethyl polysilicate oligomer was synthesized in the same manner as in Example 1, except that only the addition time of the second silica precursor was different from that shown in Table 1 below in Example 1.

Experimental Example 1: Measurement of Weight Average Molecular Weight (Mw, g/Mol)

Figure 2:
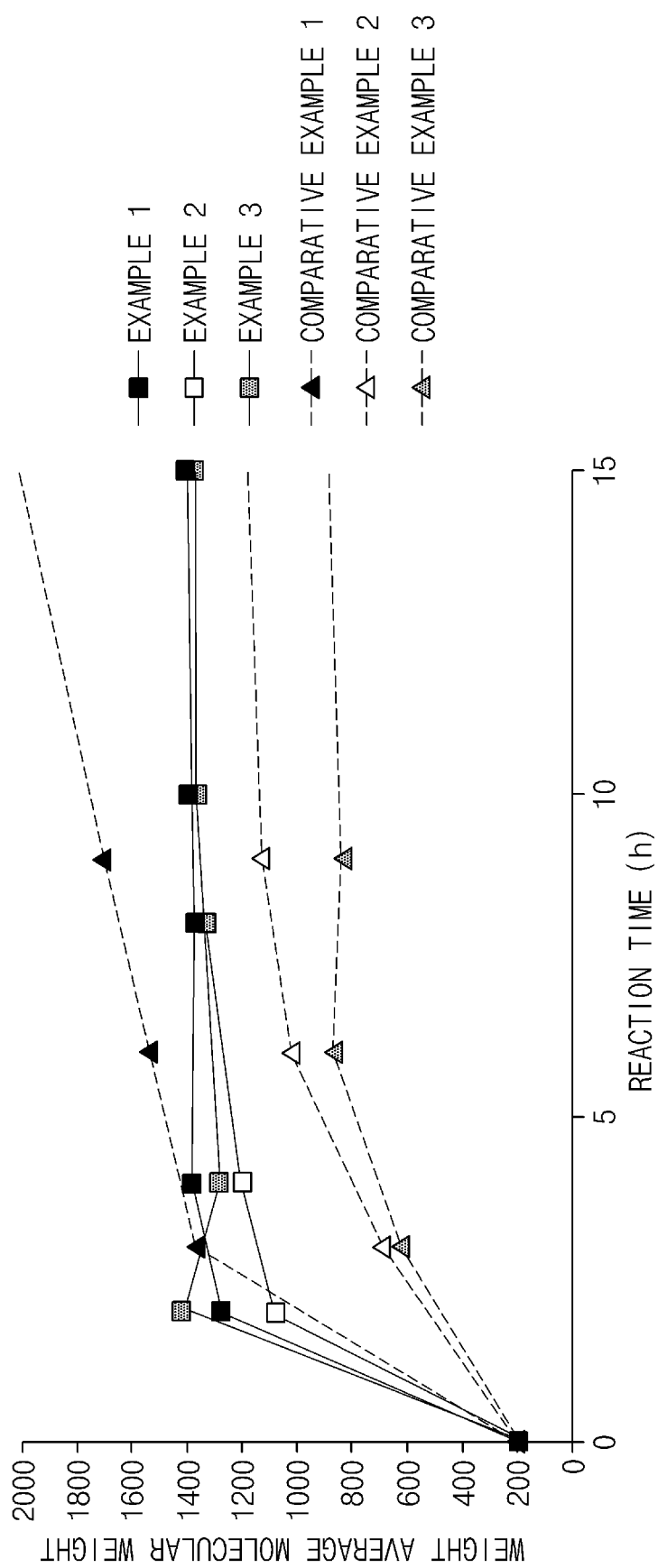
FIG. 2 is a graph showing the weight average molecular weight of a pre-hydrolyzed alkyl polysilicate synthesized by the synthesis method of Examples and Comparative Examples of the present invention.
Figure 3:
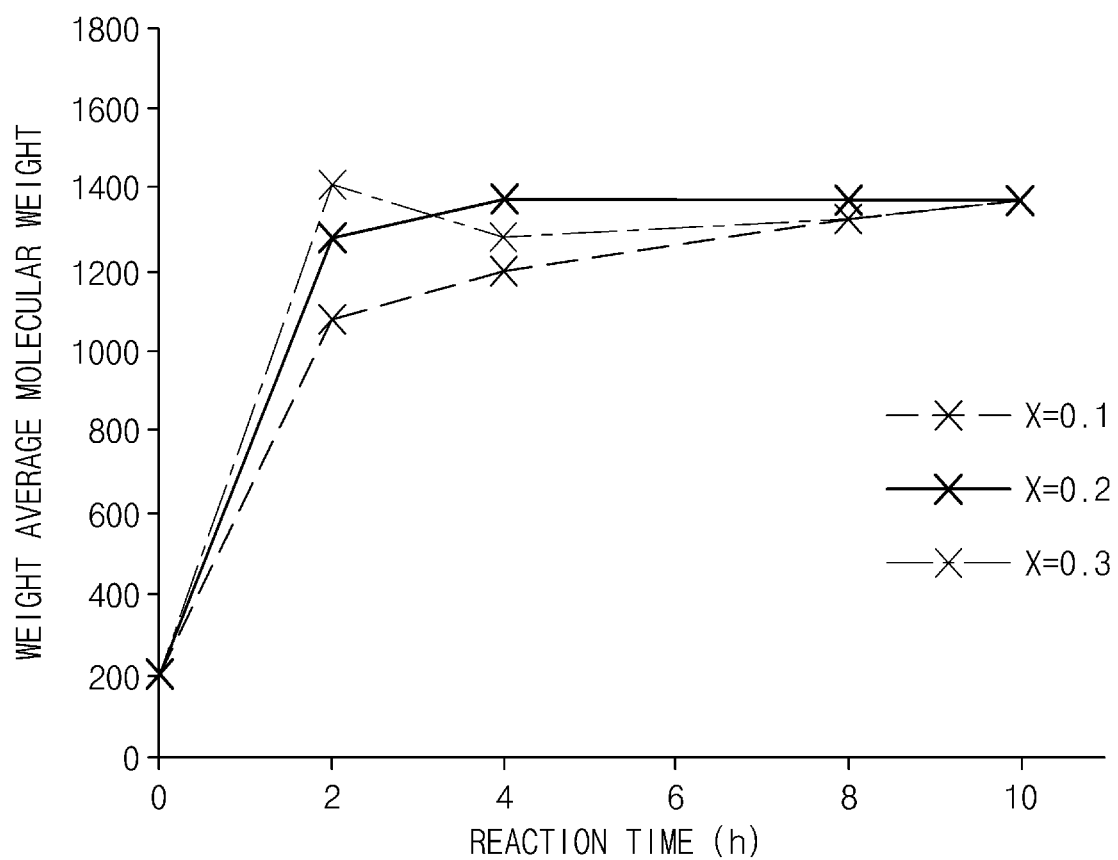
FIG. 3 is a graph showing the weight average molecular weight of a pre-hydrolyzed alkyl polysilicate according to the adding ratio of the first and second silica precursors in the synthesis method of Examples of the present invention.
Figure 4:
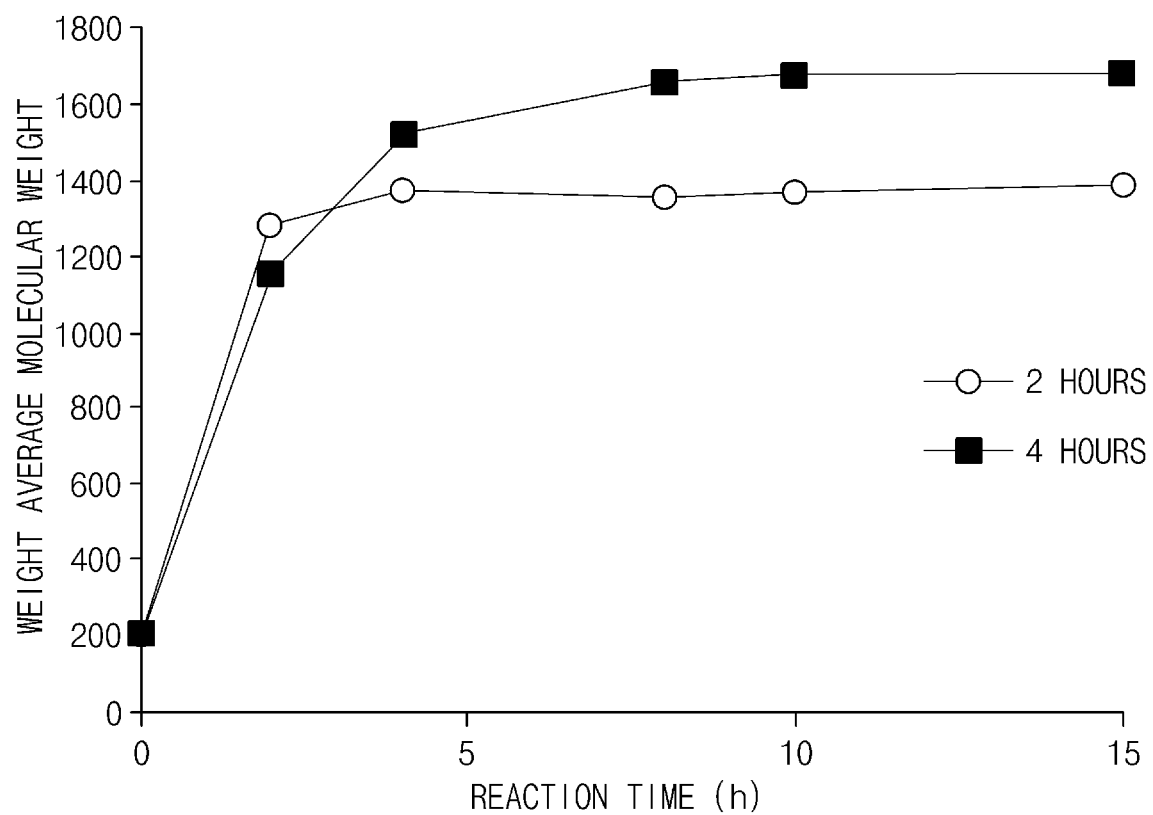
FIG. 4 is a graph showing the weight average molecular weight of a pre-hydrolyzed alkyl polysilicate according to the time point of addition of the second silica precursor in the synthesis method of Examples of the present invention.

The weight average molecular weights of the respective pre-hydrolyzed ethyl polysilicate oligomers synthesized in Examples 1 to 3 and Comparative Examples 1 to 4 were measured, and the results were shown in FIGS. 2 to 4 and Table 1. The weight average molecular weight was measured by using Gel Permeation Chromatography (GPS, Waters 2489 UV-vis Detector), and 40 mL of tetrahydrofuran (THF) was dissolved in 0.05 g of each pre-hydrolyzed ethyl polysilicate oligomer and then the mixture was filtered through a 0.45 μm filter and placed in GPC vial (4 mL), thus producing each sample. The solvent (THF) was injected at a rate of 1.0 mL/min from 1 hour before the measurement, and measured with UV-vis Detector in conditions of a measurement time of 40 minutes, an injection volume of 150 μL, and a flow rate of 1.0 mL/min. In this case, the calibration was performed by using a PS standard.

Experimental Example 2: Measurement of Gelation Reaction Time

The time taken for the gelation reaction was measured by using the respective pre-hydrolyzed ethyl polysilicate oligomers synthesized in Examples 1 to 3 and Comparative Examples 1 to 4.

Specifically, an ammonia catalyst diluted with ethanol was added in an amount of 10 vol % to the mixed solution produced by mixing each of pre-hydrolyzed ethyl polysilicate, ethanol and water at a weight ratio of 2:4:1, so that the pH was adjusted to 4 to 9 to perform the gelation reaction.

TABLE 1

| Classification | Number of TEOS additions (times) | Equivalent of water added per mol of TEOS (mol) | | Ratio of second TEOS added | Addition time of second TEOS after adding | Condensation reaction time (hr) | Gelation reaction time (min) |
| --- | --- | --- | --- | --- | --- | --- | --- |
| | | First TEOS | second TEOS | to first TEOS | first TEOS | | |
| Example 1 | 2 | 2 | 0.5 | 0.2 | 2 | 4 | 10 |
| Example 2 | 2 | 2 | 0.5 | 0.1 | 2 | 8 | 6 |
| Example 3 | 2 | 2 | 0.5 | 0.3 | 2 | 8 | 15 |
| Comparative Example 1 | 1 | 2 | — | — | — | Not be terminated | 4 |
| Comparative Example 2 | 1 | 1.5 | — | — | — | 24 | 14 |
| Comparative Example 3 | 1 | 1.3 | — | — | — | 24 | 25 |
| Comparative Example 4 | 2 | 2 | 0.5 | 0.2 | 4 | 8 | 8 |

(Effects on Condensation Reaction Time Through TEOS Addition in Two Steps)

As shown in Table 1, it was ascertained that the condensation reaction time was significantly shortened from 24 hours to 4 to 8 hours in Examples 1 to 3 of the present invention adding TEOS in two steps as compared with Comparative Examples 1 to 3 adding TEOS in single step like the conventional synthesis reaction method.

As shown in FIG. 2, the effect of adding the first TEOS completely hydrated with two equivalents of water is that the four —OR groups of 100% hydrated TEOS becomes —OH groups, which are all the condensation sites to rapidly increase the condensation reaction rate. On the other hand, when the first TEOS hydrated to less than 90% is added by hydration with 1.3 to 1.5 equivalents of water as in Comparative Examples 2 to 3, the condensation reaction rate is not high. Thus, it may be ascertained that a remarkable shortening effect of the synthesis time targeted by the present invention may not be expected.

In addition, according to FIG. 2, the condensation reaction was terminated by maximizing the condensation reaction rate with the first TEOS, and then decreasing the condensation reaction rate with the second TEOS added after about 2 hours, so that it could be found that the synthesis time could be remarkably shortened and HTEOS having the weight average molecular weight of 1000 to 1500 targeted by the present invention could be synthesized.

(Effects of Controlling the Gelation Reaction Time Depending on the Addition Ratio of the First and Second TEOSs)

As shown in Table 1, it can be observed that as the ratio of the second TEOS partially hydrated is increased, the —OR group at the end of the oligomer which w is the final product increases to increase the gelation reaction time, and on the contrary, as the ratio of the second TEOS partially hydrated is decreased, the —OH group at the end of the oligomer which i as the final product increases to decrease the gelation reaction time.

In Examples 1 to 3 of the present invention, the condensation reaction time could be remarkably shortened, and at the same time, the desired gelation reaction time of the present invention could be also secured.

Accordingly, it was found that the addition ratio of the first and second TEOSs could be controlled, thus enabling the gelation reaction time of the finally synthesized pre-hydrolyzed ethyl polysilicate oligomer to control.

(Effects of Controlling the Weight Average Molecular Weight Depending on the Addition Ratio of the First and Second TEOSs)

As shown in Table 1, FIG. 2 and FIG. 3, it could be ascertained that when the first and second TEOSs were added at a mass ratio of 10:1 to 10:3, the pre-hydrolyzed ethyl polysilicate having an appropriate weight average molecular weight of 1000 to 1500 could be synthesized.

(Measurement of Weight Average Molecular Weight Depending on the Time Point of Addition of the Second TEOS)

As shown in Table 1, Comparative Example 4 in which the second TEOS was added after 4 hours from adding the first TEOS could remarkably shorten the condensation reaction time as in Example 1 in which the second TEOS was added after 2 hours, and could perform a control so as to have an appropriate gelation reaction time.

However, as shown in FIG. 4, it was found that in Comparative Example 4, as the highly hydrated first TEOS was added to maximize the condensation rate, the first TEOS was added after 4 hours from when the weight average molecular weight rapidly increased, a pre-hydrolyzed ethyl polysilicate oligomer having a molecular weight significantly increased than the molecular weight of 1000 to 1500 targeted by the present invention was synthesized. As a result, according to the synthesis method of Comparative Example 4, it could be expected to deteriorate viscosity properties, storage stability, and processability.

However, in Example 1 in which the second TEOS was further added after 2 hours from when the first TEOS was added, it was ascertained that the condensation reaction time was significantly shortened and the appropriate gelation reaction time was secured, and at the same time, the pre-hydrolyzed ethyl polysilicate having an appropriate weight average molecular weight targeted by the present invention may be synthesized.

Through the above experiment, it may be seen that the effects of shortening the condensation reaction time and controlling the gelation reaction time and the weight average molecular weight are obtained by introducing a novel two-step HTEOS synthesis method in which the TEOS highly hydrated to 90 to 100% is added to maximize the condensation reaction rate, and the TEOS partially hydrated 25 to 70% is further added to terminate the condensation reaction, thus controlling the amount and time point of addition of TEOS.

The foregoing description of the present invention has been presented for purposes of illustration. It will be understood by those skilled in the art that various changes in form and details may be made therein without departing from the spirit and scope of the invention as defined by the appended claims. It is therefore to be understood that the above-described embodiments are illustrative in all aspects and not restrictive.

The invention claimed is:

1. A method for synthesizing a pre-hydrolyzed alkyl polysilicate, the method comprising:
   1) adding a first silica precursor to perform a first condensation reaction; and
   2) adding a second silica precursor to perform a second condensation reaction,
   wherein the first silica precursor is hydrated to 90 to 100%, and the second silica precursor is hydrated to 25 to 75%.

2. The method of claim 1, wherein the first silica precursor is hydrated with 1.8 to 2 equivalents of water.

3. The method of claim 1, wherein the second silica precursor is hydrated with 0.5 to 1.5 equivalents of water.

4. The method of claim 1, wherein the first condensation reaction rate is faster than the second condensation reaction rate.

5. The method of claim 1, wherein the silica precursor is at least one selected from the group consisting of tetra methyl ortho silicate (TMOS), tetra ethyl ortho silicate (TEOS), methyl triethyl ortho silicate, dimethyl diethyl ortho silicate, tetra propyl ortho silicate, tetra isopropyl ortho silicate, tetra butyl ortho silicate, tetra secondarybutyl ortho silicate, tetra tertiarybutyl ortho silicate, tetra hexyl ortho silicate, tetra cyclohexyl ortho silicate and tetra dodecyl ortho silicate.

6. The method of claim 1, wherein the mass ratio of the added first silica precursor and second silica precursor is 10:1 to 10:3.

7. The method of claim 1, wherein the second silica precursor is added after 1 to 3 hours from adding the first silica precursor.

8. The method of claim 1, wherein the total condensation reaction time of the synthesis method is 3 to 10 hours.

9. The method of claim 1, wherein the first and second condensation reactions are performed without a condensation catalyst.

* * * * *